Figure 3:
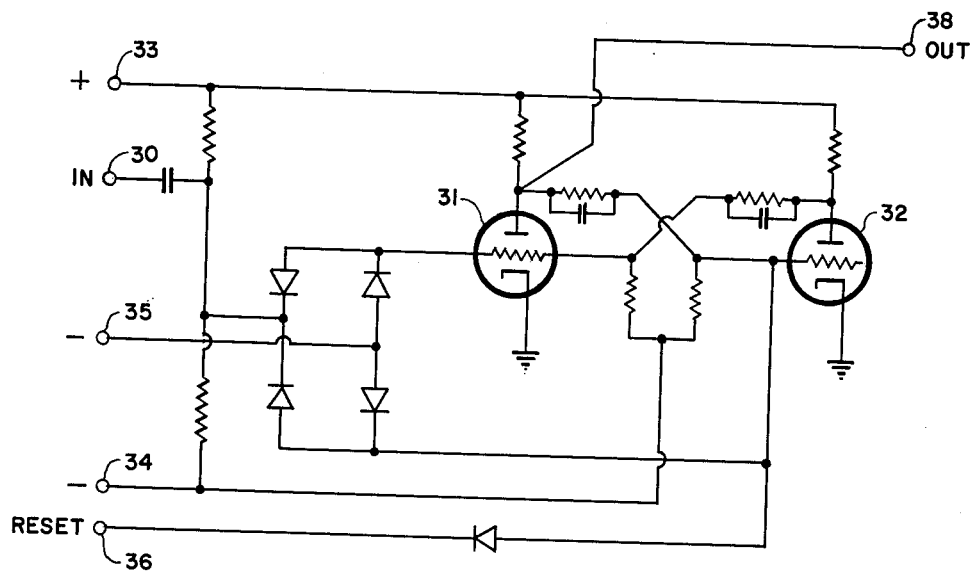

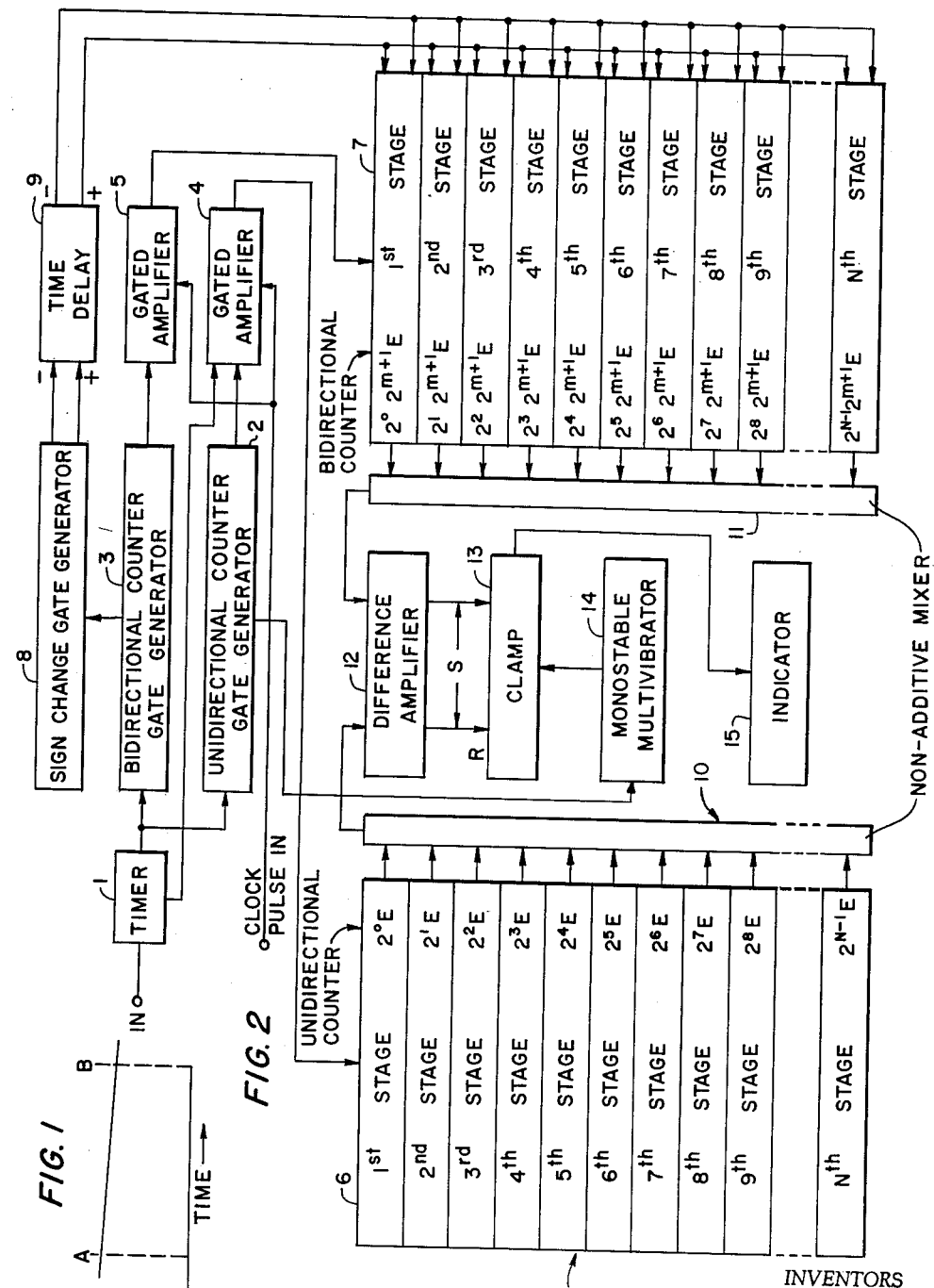

3,086,708
Patented Apr. 23, 1963

3,086,708
METHOD AND APPARATUS FOR AUTOMATIC DIGITAL PROCESS CONTROL
Howard Berkowitz, Cook County, Ill., and Bernard W. Moss, Baltimore County, Md., assignors to The Martin-Marietta Corporation, Baltimore, Md., a corporation of Maryland
Filed Oct. 30, 1961, Ser. No. 148,631
7 Claims. (Cl. 235—154)

This is a continuation-in-part of the co-pending application by Howard Berkowitz and Bernard W. Moss, Serial No. 650,139, filed April 2, 1957, now abandoned, entitled "Method and Apparatus for Automatic Digital Process Control."

The present invention relates to an electrical digital device and method for detecting the departure of an input quantity from a reference value beyond a preselected percentage of the reference value, and more particularly to such a device and method for automatically monitoring processes by detecting and indicating preselected percentage variations of analog control quantities such as voltage, current, time, or length.

A primary feature of the invention is a process control system wherein simple, accurate, and reliable digital counting circuitry is employed for the detection of variations in analog process control quantities.

The system is further featured by a digital method and circuitry whereby preselected percentage variations of analog control quantities may be detected.

In the invention the detection of control quantity variations is effected by first selecting a reference value for the control quantity to be monitored. This reference value is then converted into a digital binary count. To this end the invention provides a unidirectional and bidirectional counter each comprising a plurality of binary stages. Digitalization of the reference value is effected by generating a first series of pulses, the number of pulses in the series being representative of the reference value. These pulses are applied to both the unidirectional and bidirectional counters to effect and store a first binary count therein.

Detection of variations of the control quantity is then effected by sampling the control quantity at some preselected time and comparing its value with the stored reference value. Accordingly the value of the control quantity at the sample time is digitalized by generating a second series of pulses, the number of pulses in the series being representative of the control quantity value. The counting direction of the bidirectional counter is reversed from the counting direction in effect at the time the first count was stored therein. The second series of pulses is then applied only to the bidirectional counter to effect a second count therein. In this way a remanent count representative of either a positive or negative difference between the second count and the first count is produced in the bidirectional counter. The magnitude of the remanent count is indicative of the degree of departure of the control quantity from the reference value. A simplified form of this invention can be employed when control quantity departures are anticipated in only one direction relative to the reference quantity where as a modified form can be utilized to detect departures in either direction.

Detection of a departure of the control quantity from the reference value beyond a preselected percentage of the reference value is effected by a comparison of the remanent count in the bidirectional counter with the stored count in the unidirectional counter in a unique manner employing the binary characteristic of the counters. Such binary characteristic indicates that a difference in order of less than $m+1$ between the highest binary order of the first count and the highest binary order of the remanent count, where $2^m$ corresponds to the reciprocal of the preselected percentage, is indicative of a variation of the control quantity in excess of the preselected percentage.

Thus, in accordance with the invention, the unidirectional counter is adapted to produce a first signal representative of the order of its highest order stage registering the first count, and the bidirectional counter is adapted to produce a second signal representative of the order of its highest order stage registering the remanent count. These signals are then compared to determine the difference between the binary orders which they represent. In this way, a control signal or other indication may be produced upon a difference determination of less than $m+1$ to advise of a control quantity departure beyond the preselected permissible percentage.

Figure 4:
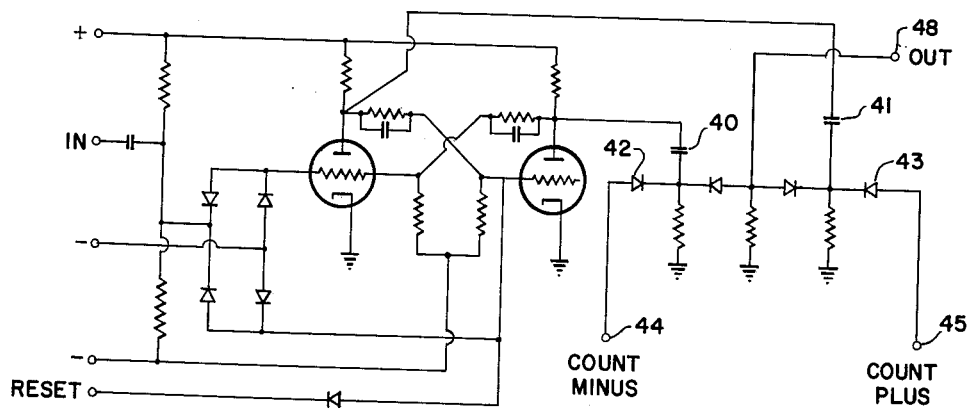
Figure 5:
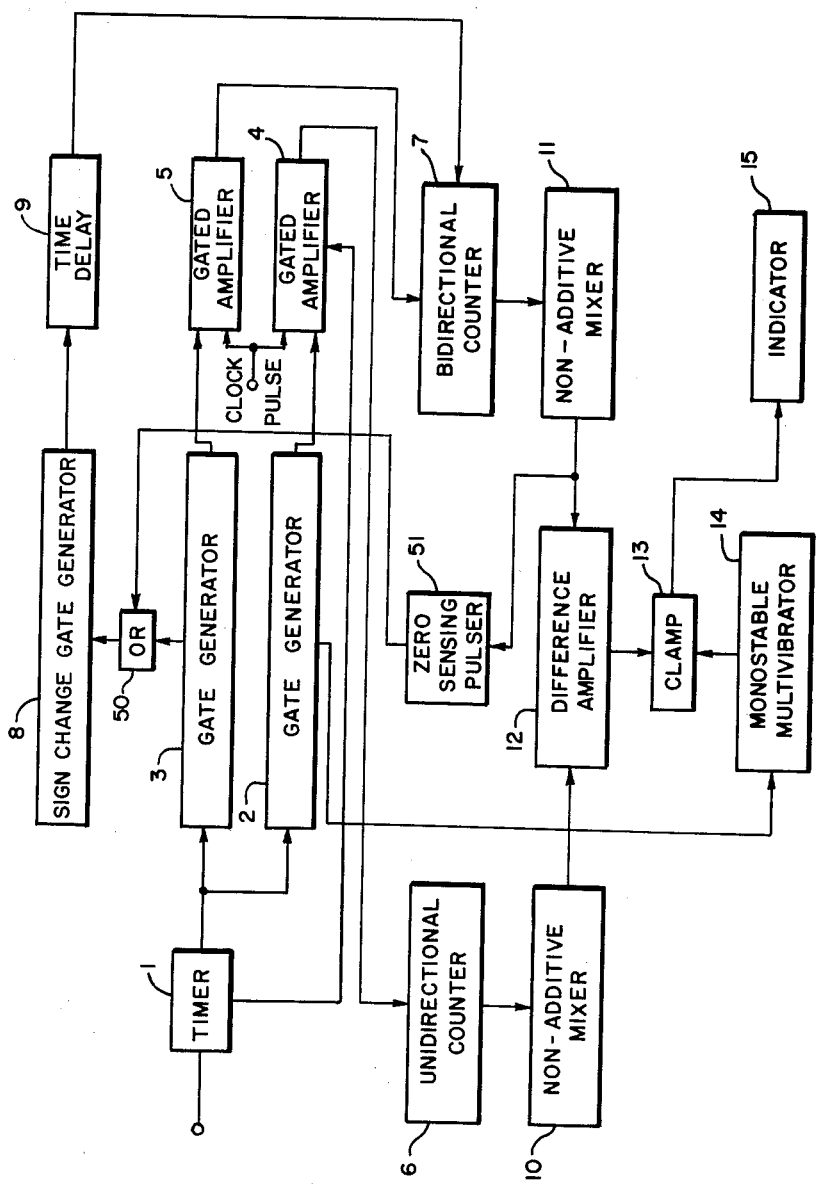

The invention can best be understood by referring to the following drawing in which:

FIGURE 1 is a graphical representation of a process control voltage plotted against time; and FIGURE 2 is a block diagram of one example of an automatic digital process control device in accordance with the invention; and FIGURE 3 is a circuit diagram of a typical unidirectional counter stage that could be utilized in conjunction with this invention; and FIGURE 4 is a circuit diagram of a typical bidirectional counter stage that could be utilized in conjunction with this invention; and FIGURE 5 is a block diagram of a process control device sensitive to control quantity variations in either direction from the reference quantity.

The present invention is best described by way of a typical process control application. Conventionally, critical parameters of a process, such as temperature, are converted into a representative voltage quantity which varies in direct proportion to the parameter. Process control is then effected by monitoring the representative voltage quantity with respect to time to detect and indicate its variations.

Referring to FIGURE 1 the voltage control quantity to be monitored is represented in a graph plotted against time. In accordance with the invention a preselected value of the control voltage is established as a reference. In the present example the voltage value at the time A is selected.

This reference value is stored in terms of a binary count within the process control device of FIGURE 2. A conventional timer circuit 1 is provided to sample the voltage quantity at the time A. At time A, the timer closes its circuit applying the voltage quantity to a unidirectional counter gate generator 2 and to a bidirectional counter gate generator 3. The gate generators both comprise conventional delay multivibrator circuits. A multivibrator of this type is adapted to produce an output gate voltage having a time duration which is proportional to the value of the input voltage. The time duration of the gate voltage out of each gate generator is therefore proportional to the reference value of the input voltage quantity at the time A.

These gate voltages are employed to produce a first series of pulses, the number of pulses in the series being representative of the reference value. Gated amplifier 4 associated with gate generator 2 and gated amplifier 5 associated with gate generator 3 are provided for this purpose. Clock pulses equally spaced in time are continuously applied to both gated amplifiers. Each gated amplifier circuit is adapted to pass these clock pulses to its output upon being enabled by the gate voltage input from its associated gate generator. In this way pulses will be developed at the output of each gated amplifier only during the time duration of the applied gate voltage. Since this time duration is proportional to the reference value the number of pulses developed at the output of each gated amplifier will be representative of the reference value.

In accordance with the invention a binary count of the pulse output of the gated amplifiers is effected and stored within a conventional unidirectional binary counter 6 and within a conventional bidirectional binary counter 7.

As is well known in the art a binary scale involves only the digits 0 and 1. Each successive order of a binary scale is therefore larger than the preceding order by a multiple of 2. The binary counters comprise a plurality of bistable counting stages, each stage being employed to register and store either a 0 or 1 count. A succeeding bistable stage of a binary counter is triggered by the preceding bistable stage and represents a one-step higher order in the binary scale than the preceding stage. The counting stages are thus connected in ascending binary order. The magnitude of a 1 count registered in a binary stage may therefore be represented by the quantity $2^{n-1}$, where $n$ is equal to the order of the stage.

To effect a binary count of the first series of pulses the pulse output of gated amplifier 4 is applied to the first stage of the unidirectional counter 6 and the pulse output of gated amplifier 5 is applied to the first stage of the bidirectional counter 7. Thus a binary count is stored in both the unidirectional counter and bidirectional counter which is representative of the reference value of the control voltage at the time A.

Referring to FIGURE 1, in the present example, the control voltage is again sampled at the time B. The timer 1 is adapted to close its circuit at this time to apply the control voltage to the gate generators 2 and 3. Each gate generator thus produces at its output a gate voltage having a time duration proportional to the value of the voltage quantity at the time B. The output gate voltages of the gate generators are then applied to the gated amplifiers 4 and 5 to produce a second series of pulses, the number of pulses in the series being representative of the value of the voltage quantity at the time B.

In accordance with the invention this second series of pulses is applied only to the bidirectional counter 7. For this reason the timer is adapted to produce a cutoff signal at the time B for disabling gated amplifier 4. The clock pulses applied to gated amplifier 4 are thus prevented from passing on to the unidirectional counter which retains the first count stored therein. The gated amplifier 5 remains operative at the time B and passes pulses to the input of the bidirectional counter when enabled by the gate voltage from gate generator 3.

To detect variations of the control voltage the counting direction of the bidirectional counter is reversed after the first series of pulses has been stored therein and before the application of the second series of pulses. This is effected by means of sign change gate generator 8 and time delay circuit 9. The sign change gate is adapted to be actuated by the trailing end of the gate voltage out of gate generator 3. Thus immediately after the first series of pulses has been applied to the bidirectional counter the sign change gate produces a signal which is applied to each stage of the bidirectional counter to reverse their counting direction. The time delay network 9 is provided to delay the arrival of this signal to the bidirectional counter enough to insure that a binary count of the first series of pulses is effected before the counting direction is reversed. The bidirectional counter remains in this reversed condition until it receives another signal from the sign change gate. Reversal of the counting direction will occur only after the second series of pulses has been applied to the bidirectional counter.

Reversal of the counting direction of the bidirectional counter produces a remanent count resulting from a subtraction of the second count representative of the voltage quantity at the time B from the first count representative of the voltage quantity at the time A. The magnitude of this remanent count is therefore indicative of the degree of departure of the voltage quantity from the reference value.

In order to detect a variation of the control quantity at the time B in excess of a preselected permissible percentage of the reference value at the time A the remanent count in the bidirectional counter is compared with the stored first count in the unidirectional counter. In this comparison a determination of the difference in order between the highest binary order of the remanent count and the highest binary order of the first count is effected. Due to the characteristic of a binary count such determination indicates a departure of the control quantity in excess of the permissible percentage when the difference between the two binary orders is less than $m+1$, where $2^m$ corresponds to the reciprocal of the preselected percentage.

This binary characteristic is best explained by way of example. Assume that the preselected permissible percentage variation is 1 part in 64. Accordingly $2^m$ as defined above is equal to 64 and $m$ is equal to 6. Thus a difference between the highest binary order of the remanent count and the highest binary order of the first count of less than $m+1=7$ should be indicative of an excessive variation in the control quantity.

Assume, for convenience, that the first count stored in the unidirectional and bidirectional counters is 256 or $2^8$. This count is indicated in binary terms by a digit 1 in the ninth order stage. Thus a remanent count of 4 or more in the bidirectional counter (a variation of 1 part in 64 of a total count of 256) is indicative of an excessive variation of the control voltage at the time B. A remanent count of 4 is represented in binary terms by a digit 1 in the third order stage of the bidirectional counter. The highest binary order of a remanent count of less than 4 can at most be the second order. This represents a separation in binary order of 7, or $m+1$, from the highest binary order of the first count. Thus a determination of a binary order difference of $m+1$ or greater indicates that the variation of the control quantity is within acceptable limits, while a binary order difference of less than $m+1$ indicates a departure of the control quantity beyond the permissible percentage.

Due to this binary characteristic the control quantity cannot vary in excess of the preselected permissible percentage without being detected by the method of comparison of the present invention. It should be noted, however, that variations of less than the permissible magnitude may result in a difference determination of less than $m+1$.

An example of the variation determination of the control quantity may be in order. A binary "1" in the ninth order stage will be present for all numbers ranging from 256 to 512. A variation with separation of $m+1=7$ would show a binary "1" in the second stage for a maximum of 3 parts in 256 to be acceptable. If the remanent count shows a binary "1" in the third or higher order stage, the first count will be rejected. Thus a variation of only 4 parts in 511 which is less than 1 part in 64 will result in a difference determination of less than $m+1$.

In order to effect the comparison described above, the unidirectional and bidirectional counters are each adapted to produce a signal representative of the order of the highest order stage registering the count stored therein. In the illustrated embodiment each stage is adapted to produce at its output a voltage signal, the value of which is representative of the binary order of the stage producing the signal. In addition, the values assigned to these order representing voltage signals are selected such that an automatic determination of a binary difference of less than $m+1$ may be effected upon a comparison of the undirectional counter signal with the bidirectional counter signal.

In the unidirectional counter the first order stage is represented by a voltage E. The value of the voltage signal representing each succeeding stage is made equal to $2^{n-1}E$ where $n$ is the order of the stage producing the voltage. On the other hand, the value of the voltage signal representing a bidirectional counter stage is made equal to $2^{n-1} \cdot 2^{m+1}E$ where $n$ is the order of the stage producing the voltage. Thus, as illustrated in FIGURE 2 the stages of the unidirectional and bidirectional counters which are separated in order by $m+1$ are represented by voltage signals having the same value. In this way a difference determination of less than $m+1$ may be effected by a comparison of the value of the voltage signal representing the highest order registered unidirectional stage with the value of the voltage signal representing the highest order registered bidirectional stage.

To effect this comparison the invention provides non-additive mixers 10 and 11. Each stage of the counters is adapted to produce its representative voltage output signal only when a count is registered therein. Thus each non-additive mixer has a plurality of inputs. It is characteristic of a non-additive mixer to pass on to its output only the largest of its voltage inputs. The voltage output of non-additive mixer 10 will therefore be a signal having a value representative of the order of the unidirectional counter stage registering the highest binary order of the first count stored therein. On the other hand, the voltage output of non-additive mixer 11 will be a signal having a value representative of the order of the bidirectional counter stage registering the highest binary order of the remanent count stored therein.

The output signals of the non-additive mixers are then applied to a comparator circuit, difference amplifier 12. The comparator circuit is adapted to produce an output signal S, the value of which is a function of the difference between the input signals. In addition, the polarity of signal S with respect to a reference potential R established by the input signal from the unidirectional counter indicates whether the bidirectional counter voltage signal is smaller, larger, or equal to the unidirectional counter voltage signal.

A D.C. switched clamp circuit 13 is provided to produce an output signal only when the polarity of S indicates that the bidirectional counter output voltage is greater than the unidirectional counter output voltage. The output signal of the switched clamp circuit is therefore representative of a binary order difference determination of less than $m+1$.

The name "clamp" is applied to a wide variety of electronic devices which hold a circuit point to a preselected base reference potential, and develop an output signal only when the input signal is a preselected polarity with respect to the base reference. Thus by applying to the clamp the potential R as the reference, and the signal S as the input signal, the clamp may be adapted to produce an output signal only when the signal S is of a polarity with respect to the reference R which is indicative of a binary order difference of less than $m+1$.

The output of the difference amplifier is continuously varying during the second count in the bidirectional counter. The process control, however, is concerned with the output of the difference amplifier only when the final remanent count is stored in the bidirectional counter. For this reason the clamp is adapted to be switched into operation only during the time interval immediately following the storage of the remanent count and to produce no output at all other times.

Monostable gate generator 14 is provided to switch the clamp into operation. The monostable gate generator is triggered into operation by the trailing end of the gate voltage from gate generator 2. Thus the monostable gate generator will produce an output voltage at the times immediately following the storage of the first count in both the unidirectional and bidirectional counters, and the storage of the remanent count in the bidirectional counter. The time immediately following the storage of the first count can be made insignificant by setting the output voltages of the non-additive mixers equal. By this arrangement, the difference amplifier will not produce a voltage output following the initial count storage.

The output of the clamp circuit is connected to an indicator circuit 15. The indicator is adapted to signal the presence of a clamp voltage output thus indicating an excessive variation of the monitored control voltage. The clamp output voltage might also be employed to trigger a control function as advised by the control quantity variation.

FIGURE 3 shows a typical circuit that could be employed as a unidirectional counter stage in a process control device in accordance with this invention. In particular, a series of these stages are shown in block form for unidirectional counter 6 in FIGURE 2. The circuit of FIGURE 3 is basically a multivibrator circuit in which the pulses to be counted are introduced at terminal 30. Vacuum tubes 31 and 32 are connected in a multivibrator configuration. Positive and negative power supplies are connected at terminals 33 and 34 respectively and a bias potential is selectably introduced at terminal 35. A reset signal can be introduced at terminal 36 either to insure that the stage is registering a "0" count or to clear the register of a stored count. The output of the stage is introduced to terminal 38. The output at terminal 38 which is a square wave or step function, of course, is then differentiated and introduced to control the count stored in the next counter stage and is also introduced to non-additive mixer 10. This output could be sampled at a "read-out" time or could be used to switch a steady D.C. voltage to mixer 10 at a magnitude representative of the order of the stage.

FIGURE 4 reveals a typical circuit that could be utilized for each of the stages in bidirectional counter 7 of FIGURE 2. As can be seen in the drawing, FIGURE 4 is basically a bistable multivibrator somewhat similar to FIGURE 3 but including some additional circuitry to provide bidirectional operation. In particular the output of either multivibrator tube can be introduced to output terminal 48 via coupling capacitors 40 and 41. The output signal that is actually coupled to terminal 48 is controlled by the biasing of diodes 42 and 43 which is in turn determined by selectably introducing a signal from sign change generator 8 through time delay 9 to either the "count minus" terminal 44 or the "count plus" terminal 45. The counting operation of all the bidirectional stages will thus be cumulative or subtractive depending upon the output state of sign change generator 8. It should be noted that the output signal which is allowed to be introduced to terminal 48 is then differentiated to control the count of the next stage. Additionally the signal at terminal 48 can be coupled directly to non-additive mixer 10 for sampling or can be used to switch a steady state voltage into mixer 10 representative in magnitude of the order of the stage.

FIGURE 5 is a block diagram of a process control device of the present invention which is particularly useful for detecting control quantity variations exceeding a preselected value in either direction from the reference value. Blocks in FIGURE 5 which have a similarly operating counterpart in FIGURE 2 are identically numbered in FIGURE 5. Thus a general description of the circuits in FIGURE 5 which have identical counterparts in FIGURE 2 will be omitted from the description of FIGURE 5 for purposes of clarity. It is to be understood that counters 6 and 7 of FIGURE 5 each contain a plurality of counting stages identical with that shown in FIGURE 2.

It can be seen that the device illustrated in FIGURE 5 is generally the same as that shown in FIGURE 2 with the exception that FIGURE 5 includes additionally "or" gate 50 and zero sensing pulser 51. In fact, if the control quantity is decreasing with respect to the reference quantity (as is illustrated in FIGURE 1), the system will operate exactly the same as was described for FIGURE 2 with the exception that the trailing edge of the gate voltage out of gate generator 3 is coupled to sign change gate generator 8 through "or" gate 50.

Assume next that the control quantity at the sampling time has increased with respect to the reference quantity. Referring to FIGURE 1, this would means that the control voltage at time B would be greater in magnitude than at time A. This would means that the count being introduced at time B to bidirectional counter 7 would exceed the count originally stored therein at time A. When bidirectional counter 7 has been completely emptied of its originally stored count, the zero sensing pulser 51 will introduce a signal to "or" gate 50 which will in turn reverse the counting direction of counter 7. Thus instead of filling up and continuing to count down, the bidirectional counter 7 will again start to count up. This will continue until the count is completed thereby leaving a remanent count for comparison with the reference count stored in unidirectional counter 6 in the manner as has been described hereinbefore. Obviously an output can be introduced from pulser 51 to indicator 15 for the purpose of indicating that the excessive control quantity variation has been positive or negative with respect to the reference quantity. Further, it is readily apparent that the configuration of FIGURE 5 could operate completely satisfactorily by omitting "or" gate 50, feeding the output from gate generator 3 directly to sign change gate generator 8 and then feeding the output from pulser 51 to another sign change generator separate from but similar in operation to generator 8. This arrangement would have the advantage that no counts would be lost due to the delay of time delay circuit 9 following the emptying of counter 7. However, the actual time delay of circuit 9 can be set so that only one pulse would not be counted which would introduce a negligible error.

The following examples are listed herein for purposes of illustrating that typical circuits are available to those having normal skill in the art for use in the present invention either directly or with slight modification. For brevity, Ref. $a$ hereafter means the book, "High Speed Computing Devices," (McGraw Hill 1950) and Ref. $b$ means the book "Wave Forms"—volume 19 of the M.I.T. Radiation Laboratory Series—(McGraw Hill 1949).

Timer 1: Ref. $a$, section 15–2–4 discusses the general requirements and FIG. 15–3 could typically be used. In Ref. $b$, the circuits of FIG. 5.53 (page 203) or 5.54 (page 204) could be used.

Unidirectional Counter Gate Generator 2 and Bidirectional Counter Gate Generator 3: Ref. $b$, section 5.5 (pages 166–171) describe functioning, waveforms and circuits and the circuits of FIG. 5.10 (page 168), 5.12 (page 170) or 5.14 (page 171) could be used.

Sign Change Gate Generator 8 and Time Delay 9: Ref. $b$, section 5.10 (pages 176–182) describes the functioning and circuits for short pulse lengths (0.1 to 2 us).

Monostable Multivibrator 14: Ref. $b$ circuits of FIG. 5.25 (page 180), 5.26 (page 180), 5.27 (page 181) or 5.29 (page 182) could be used.

Gated Amplifiers 4 and 5: Ref. $a$, section 4–1, 4–2, 4–2–1, 4–2–2, 4–2–3, 4–3, 4–3–1, 4–3–2, 4–3–3, 4–3–4 (pages 32–41) describe requirements and typical functioning. The circuits of FIG. 4–1$a$ (page 37), 4–1$b$ (page 38), 4–1$c$ (page 39), 4–2$a$ (page 40), 4–2$b$ (page 41) could be used. Ref. $b$, chapter 10 (pages 364–388) describe the functioning and the circuits of FIGS. 10.6 (page 370), 10.15 (page 378), and 1.16 (page 379) are considered most applicable.

Counters 6 and 7 (see FIGURES 3 and 4 of this application): Ref. $a$, sections 3–1, 3–2, 3–3, 3–4 and 3–5 (pages 12–19) describe principles, functioning and circuits. Circuits of FIGS. 3–2 (page 15), 3–3 (page 16) and 3–4 (page 18) can be used. Ref. $b$, section 5.4 (pages 164–166) gives typical functioning circuits of FIG. 5.4 (page 164), 5.6 (page 166), 5.7 (page 166) are the most applicable circuits. Ref. $b$, section 17.3 (pages 604–612) also describes counters and the circuits of FIG. 17.3 (page 605), 17.4 (page 607), 17.5 (page 609), and 17.6 (page 609) are applicable.

Non-additive Mixers 10 and 11: Ref. $b$, sections 9.1 through 9.7 (pages 325–335) describe typical circuits and the circuits of FIGS. 9.4 ($a$) (page 330), 9.5 (page 332), 9.6 (page 332) and 9.7 (page 332) are applicable and useful.

Differential Amplifier 12: Ref. $b$, sections 9.21 and 9.22 (pages 357–361) describe functioning and the circuits of FIG. 9.34 (page 360), 9.44 (page 360) and 9.45 are useful. Ref. $b$, section 14.6 (pages 524–532) is also applicable as is the circuits of FIGS. 14.33 ($a$) (page 529) and 14.34 (page 530). Section 18.3 (page 640–646) is also applicable as is the circuit of FIG. 18.13 (page 642).

Clamp 13: Ref. $b$, section 3.7 (pages 49–52) describes requirements and functioning of the circuit given in FIG. 3.13 (page 50) which is applicable.

Indicator 15: Ref. $b$, section 17.6 (page 619) gives "Methods for Reading the Count."

Preferred embodiments of the invention have been described. Various changes and modifications, however, may be made within the scope of the invention as set forth in the appended claims.

We claim:
1. An electrical digital device for producing an indication representative of the departure of an input quantity from a predetermined reference value beyond a preselected percentage of said reference value, which comprises means for generating a first series of pulses, the number of pulses in said series being representative of the said reference value, means for effecting a first binary count of the number of said first series of pulses, said first binary count means producing from said first binary count a first signal representative of the order of the highest binary order of said first count, means for generating from said input quantity a second series of pulses, the number of pulses in said series being representative of the value of said input quantity, means for effecting a second binary count of the number of said second series of pulses, said second binary count means being constructed and arranged for effecting a subtraction of said second binary count from said first binary count to produce a remanent binary count and for producing from said remanent binary count a second signal representative of the order of the highest binary order of said remanent count, means for comparing said first signal with said second signal to determine the difference between the binary orders represented by said first and second signals, and means for producing an indication when said difference in binary order is less than $m+1$, where $2^m$ corresponds to the reciprocal of the said preselected percentage, said indication being representative of a departure of said input quantity from said reference value beyond said preselected percentage of said reference value.

2. An electrical digital device for producing an indication representative of the departure of an input quantity from a predetermined reference value beyond a preselected percentage of said reference value comprising a unidirectional binary counter having a plurality of counting stages connected in ascending binary order, a bidirectional binary counter having a plurality of counting stages connected in ascending binary order, a pulse generating circuit adapted to produce at its output a first series of pulses, the number of pulses in said series being representative of the said reference value, the output of said pulse generating circuit being coupled into both said binary counters to store therein a first binary count of the number of said first series of pulses, said unidirectional counter being adapted to produce at its output a first signal representative of the order of its highest order stage registering the said first count, an electrical sign change circuit coupled to the said bidirectional counter and adapted to reverse the counting direction thereof after the said first binary count is stored therein, another pulse generating circuit adapted to produce at its output a second series of pulses, the number of pulses in said series being representative of the value of said input quantity, the output of the latter said pulse generating circuit being coupled into the said bidirectional counter to effect therein a second binary count of the number of said second series of pulses, whereby a remanent count representative of the difference between the said first binary count and the said second binary count is stored in the said bidirectional counter, said bidirectional counter being adapted to produce at its output a second signal representative of the order of its highest order stage registering said remanent count, an electrical comparator circuit connected to be responsive to said first signal and said second signal and adapted to produce an output signal representative of the difference between the binary orders represented by said first and second signals, and electrical indicating means coupled to said comparator circuit and adapted to produce an indication when the output signal from said comparator circuit is representative of a difference in binary order of less than $m+1$, where $2^m$ corresponds to the reciprocal of the said preselected percentage, said indication being representative of a departure of said input quantity from said reference value beyond said preselected percentage of said reference value.

3. An electrical digital device for producing an indication representative of the departure of an input quantity from a predetermined reference value beyond a preselected percentage of said reference value comprising a unidirectional binary counter having a plurality of counting stages connected in ascending binary order, a bidirectional binary counter having a plurality of counting stages connected in ascending binary order, a pulse generating circuit adapted to produce at its output a first series of pulses, the number of pulses in said series being representative of the said reference value, the output of said pulse generating circuit being coupled into both said binary counters to store therein a first binary count of the number of said first series of pulses, said unidirectional counter being adapted to produce at its output a first voltage signal having a value $2^{n-1}E$, where $n$ is the value of its highest order stage registering the said first count, and $E$ is a voltage value representative of the order of its lowest order stage, an electrical sign change circuit coupled to the said bidirectional counter and adapted to reverse the counting direction thereof after the said first binary count is stored therein, another pulse generating circuit adapted to produce at its output a second series of pulses, the number of pulses in said series being representative of the value of said input quantity, the output of the latter said pulse generating circuit being coupled into the said bidirectional counter to effect therein a second binary count of the number of said second series of pulses, whereby a remanent count representative of the difference between the said first binary count and the said second binary count is stored in the said bidirectional counter, said bidirectional counter being adapted to produce at its output a second voltage signal having a value $2^{n-1}\cdot 2^{m+1}E$, where $n$ is the order of its highest order stage registering said remanent count, and $2^m$ corresponds to the reciprocal of the said preselected percentage, an electrical comparator circuit connected to be responsive to said first signal and said second signal and adapted to produce an indication when said second signal exceeds said first signal, said indication being representative of a departure of said input quantity from said reference value beyond said preselected percentage of said reference value.

4. An electrical digital device for producing an indication representative of the departure of an input quantity from a predetermined reference value beyond a preselected percentage of said reference value comprising a unidirectional binary counter having a plurality of counting stages connected in ascending binary order, a bidirectional binary counter having a plurality of counting stages connected in ascending binary order, a pulse generating circuit constructed and arranged for producing at its output a first series of pulses, the number of pulses in said series being representative of the said reference value, the output of said pulse generating circuit being coupled into both said binary counters to store therein a first binary count of the number of said first series of pulses, each counting stage of said unidirectional counter being constructed and arranged for producing at its output upon the registration of a count therein a voltage signal having a value of $2^{n-1}E$, where $n$ is the order of the stage producing the voltage signal, and $E$ is a voltage value representative of the order of the lowest order stage of said unidirectional counter, a first electrical non-additive mixer circuit coupled to the output of each counting stage of said unidirectional counter, said first mixer circuit being constructed and arranged for developing at its output only the largest of the said voltage signals produced by said counting stages, an electrical sign change circuit coupled to the said bidirectional counter for reversing the counting direction thereof after the said first binary count is stored therein, another pulse generating circuit for producing at its output a second series of pulses, the number of pulses in said series being representative of the value of said input quantity, the output of the latter said pulse generating circuit being coupled into the said bidirectional counter to effect therein a second binary count of the number of said second series of pulses, whereby a remanent count representative of the difference between the said first binary count and the said second binary count is stored in the said bidirectional counter, each counting stage of said bidirectional counter being constructed and arranged for producing at its output upon the registration of a count therein a voltage signal having a value $2^{n-1}\cdot 2^{m+1}E$, where $n$ is the order of the stage producing the voltage signal, and $2^m$ corresponds to the reciprocal of said preselected percentage, a second electrical non-additive mixer circuit coupled to the output of each counting stage of said bidirectional counter, said second mixer circuit being constructed and arranged for developing at its output only the largest of the said voltage signals produced by said counting stages, and an electrical comparator circuit coupled to the outputs of said first and second non-additive mixer circuits for producing an indication when the voltage signal output of said second non-additive mixer circuit exceeds the voltage signal output of said first non-additive mixer circuit, said indication being representative of a departure of said input quantity from said reference value beyond said preselected percentage of said reference value.

5. An electrical digital device for producing an indication representative of the departure of an input quantity from a predetermined reference value beyond a preselected percentage of said reference value comprising a unidirectional binary counter having a plurality of counting stages connected in ascending binary order, a bidirectional binary counter having a plurality of counting stages connected in ascending binary order, gating circuit means connected to receive digital information representative of an input quantity, said gating circuit means being constructed and arranged for producing said digital information at the output thereof during preselected sampling periods, said gating circuit means having the output thereof coupled into both said binary counters to store therein a first binary count of the number of a first series of pulses, said unidirectional counter being constructed and arranged for producing at its output a first signal representative of the order of its highest order stage registering the said first count, a first electrical sign change circuit coupled to the said bidirectional counter for reversing the counting direction thereof after the said first binary count is stored therein, blocking circuit means connected to prevent said unidirectional binary counter from counting said digital information during the production of a second series of pulses at the output of said gating circuit means, said second series of pulses being introduced to said bidirectional counter so as to effect therein a second binary count, first and second non-additive mixers coupled to the output of said unidirectional counter and said bidirectional counter respectively, sensing circuit means connected to sense the output of said second non-additive mixer so as to produce an output signal when the output of said second mixer reaches a minimum level, a second sign change circuit coupled to said bidirectional counter and said sensing circuit means to re-establish the original counting direction thereof upon receiving said output signal from said sensing circuit means, whereby a remanent count representative of the difference between said first binary count and said second count is stored in said bidirectional counter, comparator circuit means connected to be responsive to the signals contained in said first and second non-additive mixers to produce a difference signal representative of the difference between the binary orders of said first and second binary counts, indicating means coupled to said comparator circuit means to produce an indication representative of said difference signal, and means to equalize the binary counts stored in said binary counters so as to prepare said electrical digital device for the succeeding digital comparison operation.

6. An electrical digital device for producing an indication representative of the departure of an input quantity from a predetermined reference value beyond a preselected percentage of said reference value comprising a unidirectional binary counter having a plurality of counting stages connected in sequential binary order, a bidirectional binary counter having a plurality of counting stages connected in sequential binary order, means for producing a first series of pulses at a constant repetition rate, gating circuit means coupled for producing said first series of pulses at the output thereof during a period of time proportional to the magnitude of an input quantity, said gating circuit means having the output therefrom coupled into both said binary counters to store therein a first binary count of the number of a first series of pulses, said unidirectional counter having at its output a first signal representative of the order of its highest order stage registering the said first count, means for isolating said unidirectional counter from binary counts subsequent to said first binary count, sensing circuit means for providing an output signal whenever said bidirectional counter has been cleared of said first binary count during said subsequent binary count, "or" circuit means coupled for receiving the output signals from said sensing circuit means and for receiving a signal representative of the end of said first binary count, an electrical sign change circuit constructed and arranged for selectably reversing the counting direction of said bidirectional counter, the output of said "or" circuit means being connected for controlling the state of said sign change circuit so that the counting direction of said bidirectional counter will be reversed after the said first binary count is stored therein and will be returned to the original counting direction whenever said binary count has been cleared therefrom by a subsequent binary count greater than said first binary count, and means for comparing the binary counts stored in both said counters for providing an output indicative of the difference therebetween.

7. An electrical digital device in accordance with claim 1 which includes means for reversing the counting direction of said second binary count effecting means after said second binary count equals said first binary count.

No references cited.